E. S. JONES.
AUTOMATIC LIFE SAVING FENDER FOR AUTOMOBILES.
APPLICATION FILED JUNE 7, 1921.

1,398,434.

Patented Nov. 29, 1921.

Inventor
Edward S. Jones,

By Shepherd & Campbell
Attorneys

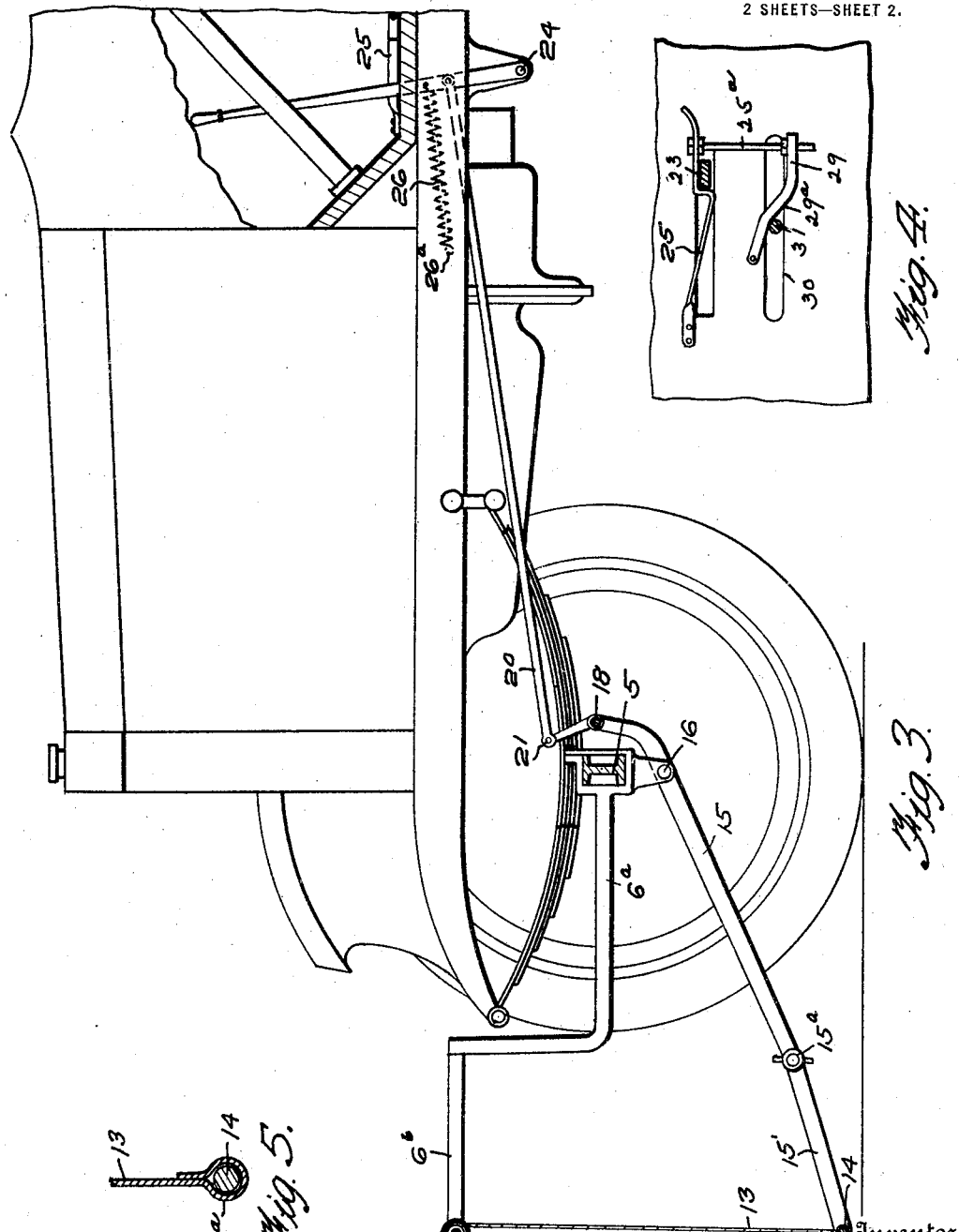

UNITED STATES PATENT OFFICE.

EDWARD S. JONES, OF MOBILE, ALABAMA, ASSIGNOR OF ONE-TENTH TO FRED A. HIXON, ONE-TENTH TO GEORGE KILBORN, AND ONE-TENTH TO GEORGE S. BOWONOUS, ALL OF MOBILE, ALABAMA.

AUTOMATIC LIFE-SAVING FENDER FOR AUTOMOBILES.

1,398,434. Specification of Letters Patent. Patented Nov. 29, 1921.

Application filed June 7, 1921. Serial No. 475,608.

*To all whom it may concern:*

Be it known that I, EDWARD S. JONES, a citizen of the United States, residing at Mobile, in the county of Mobile and State of Alabama, have invented certain new and useful Improvements in Automatic Life-Saving Fenders for Automobiles, of which the following is a specification, reference being had therein to the accompanying drawings.

This invention relates to an automatic life saving fender for automobiles, street cars and other self propelled vehicles. The object of the invention is to provide a fender extending across the front of a vehicle and occupying, normally, but little space, but comprising elements, which when released, automatically act to dispose a stout curtain or flexible shield between the point at which the device is normally disposed and the ground, and extending entirely across the front of such vehicle. The result is that if a person is struck by a vehicle equipped with a device of this character such person will be engaged by a relatively soft and yielding surface which will shove the person ahead of the vehicle the short distance necessary for the driver to bring the vehicle to a stop, without seriously bruising such person or breaking any of his or her bones.

Further objects and advantages of the invention will be set forth in the detailed description which follows.

In the accompanying drawing:

Fig. 3 is a partial longitudinal sectional view with the web or curtain lowered; and Fig. 4 is a detail plan view of a modification; and Fig. 5 is a sectional view through the lower edge of the curtain.

Like numerals designate corresponding parts in all of the figures of the drawing.

Figure 1:
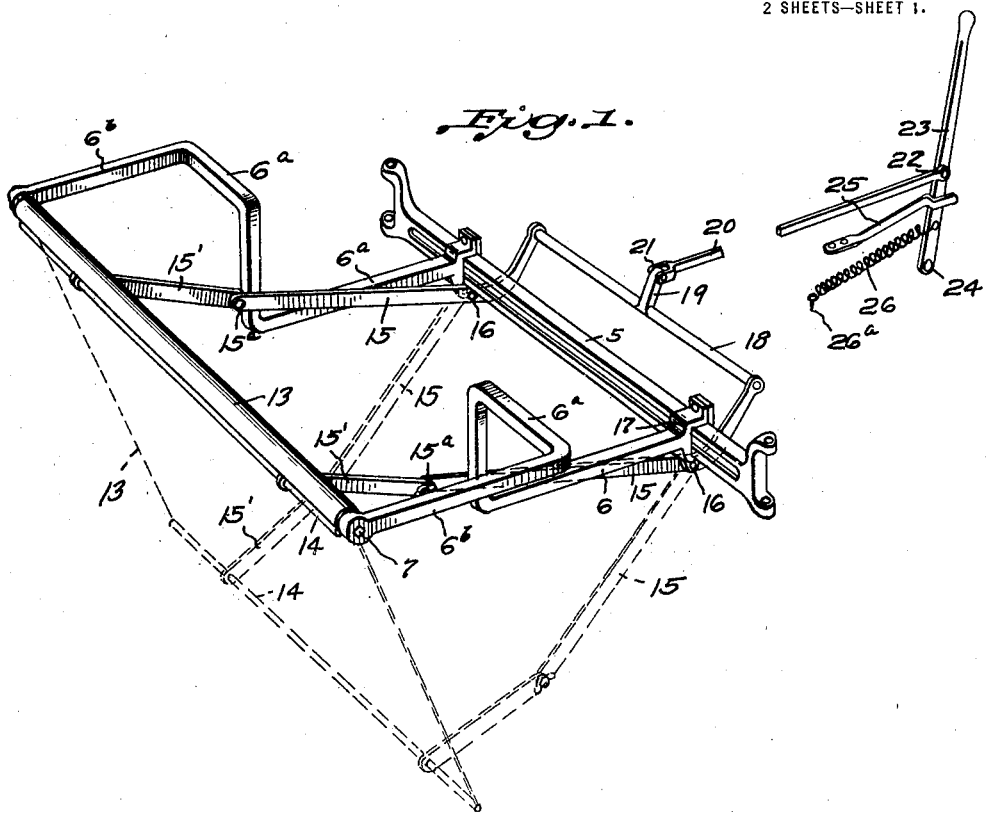
Figure 1 is a perspective view of an apparatus constructed in accordance with the invention showing the same associated with the front axle of an automobile.
Figure 2:
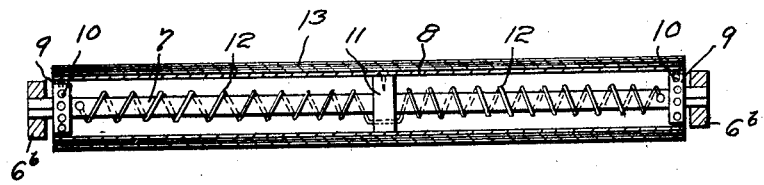
Fig. 2 is a view in section through a spring actuated roller, hereinafter described.

In carrying out the invention I apply to a supporting element of the vehicle, such as the front axle 5 of an automobile, a pair of rigid arms 6 comprising the outturned portions 6$^a$ and the forwardly extending terminal portions 6$^b$, by virtue of which construction the distance between the portions 6$^b$ is rendered greater than the distance between the points at which the arms 6 are secured to the axle 5, and this in turn renders the protecting curtain or fender of such width as to extend entirely across the front of the automobile. A rod 7 is fixedly mounted at the forward ends of the forwardly extending portion 6$^b$ and supports a roller 8. This roller has rotative bearing upon bearing blocks 9 and may be provided with ball-bearings 10, if desired. The central portion of the roller is fixed to a block 11 and this block in turn has springs 12 connected thereto, the opposite ends of said springs being connected to the fixed blocks 9. The roller 8 receives and supports a curtain or web 13 which may be of any suitable flexible material, such as canvas, leather, rubber, or the like. The springs 12 normally tend to turn the roller 8 in such direction as to wind the web 13 thereon. The lower edge of the web is folded or turned over to form a cushioning tube 13$^a$ which houses a rod 14 to the outer ends of which actuating arms 15 are connected. These arms are pivoted at 16 to bearings 17 carried by the axle 5, and the rear ends of said arms are connected by a cross bar 18 that is rigid with said arms. The cross bar 18 in turn carries a rigid upwardly extending arm 19 to which the forward end of a link 20 is pivotally connected at 21. The rear end of the link 20 is pivotally connected at 22 to a hand lever 23 which extends through a slot 23$^a$ formed in the floor of the automobile, the lower end of said lever being pivoted at 24 to any suitable support beneath the floor of the car. A detent or latch 25 of spring material, carried by the floor of the car, holds the lever against forward movement after it has been pulled rearwardly but this detent is capable of lateral movement under a thrust by the foot of the operator to release the lever and to permit said lever to move forwardly. A strong spring 26 is connected to a fixed element 26$^a$ and to the lever 23 and its strength is such as to overcome the action of the springs 12, so that if the lever 23 be released the spring 26 will immediately act to move the cross bar 18 and the upper ends of the arms 15 forwardly and to consequently throw the outer ends of the arms downwardly, these arms carrying with them the rod 14 and consequently withdrawing the web 13 from the roller 8 and disposing said web as a barrier entirely across the front of the vehicle. The arms 15 comprise in their length adjustable sections 15' capable of having their angularity with respect to the remainder of the arms adjusted by joints 15ª. Thus the web may be adjusted to come as close to the ground or roadbed as may be desired.

When the lever 23 is pulled rearwardly it is held in its rearward position by the latch 25 (which snaps in front of said lever) and the upward movement of the forward ends of the arms 15 permits the springs 12 to wind the web 13 upon the roller 8.

In Fig. 4 I have illustrated means for so correlating lever 23 with the emergency brake lever of the vehicle, that if said emergency brake lever be pulled rearwardly to set the brakes the lever 23 will be automatically released from its detent to lower the fender. To this end the detent or latch 25 is provided with a rod 25ª which engages with a cam arm 29 that is pivoted to the floor of the vehicle adjacent the slot 30 in which the emergency brake lever, indicated in section at 31, moves. When lever 31 is pulled rearwardly in slot 30 it acts against the inclined or cam edge 29ª of cam arm 29 to act upon rod 25ª to move detent 25 out of restraining position with respect to lever 23.

However with respect to all of the mechanism shown and described it is to be understood that the drawings are merely illustrative of principles and are not intended to limit me to any specific construction. There are many ways in which the apparatus may be arranged and it is to be understood that the invention is not limited to the precise construction set forth but that it includes within its purview whatever changes fairly come within either the terms or the spirit of the appended claims.

Having described my invention, what I claim is:

1. The combination with a vehicle, of rigid supports carried thereby, a spring actuated roller carried by said supports, a web connected with said roller to be wound thereon, swinging arms engaged with the lower edge of said web, spring means normally tending to force said arms downwardly and means controllable from the driver's seat for lifting said arms against the action of the last named spring means.

2. A device of the character described comprising in combination with an automobile a pair of rigid supports connected to the front axle of said automobile, a spring actuated roller carried by said support, a web adapted to be wound upon said roller by the action of the spring therein, a bar connected to the lower edge of said web, a rod fixed to the lower edge of said web, arms pivoted intermediate their ends upon the front axle of the automobile and engaged with said rod, spring means of a strength to overcome the action of the spring roller, tending to swing said arms downwardly and means controllable from the driver's seat for swinging said arms upwardly.

3. A structure as recited in claim 6 wherein the means for swinging said arms upwardly comprises a lever pivoted beneath the floor of the automobile and extending through a slot therein and a link connecting said lever with said arms through the medium of a cross bar.

4. A structure as recited in claim 6 wherein the means for swinging said arms upwardly comprises a lever pivoted beneath the floor of the automobile and extending through a slot therein, a link connecting said lever with said arms through the medium of a cross bar and a detent for said lever releasable by the foot.

5. The combination with a vehicle of a fender comprising a flexible web extending across the front of said vehicle, a roller upon which said web may be wound, spring means for actuating said roller, an emergency brake lever and means under control of the emergency brake lever for actuating said web against the action of the spring roller.

6. The combination with a vehicle of a fender comprising a flexible web extending across the front of said vehicle, a roller upon which said web may be wound, spring means for actuating said roller, swinging arms engaged with the lower edge of said web, spring means tending to force said arms downwardly, a lever controllable from the driver's seat, connections between said lever and the swinging arms for lifting said swinging arms, a spring detent for said lever, an emergency brake lever and means actuated by the movement of the emergency brake lever to brake setting position for releasing said detent.

In testimony whereof I hereunto affix my signature.

EDWARD S. JONES.